United States Patent Office.

CARL STRAUB, OF SYRACUSE, NEW YORK.

COMPOSITION OF BUILDING MATERIAL FOR ARCHITECTURAL PURPOSES.

SPECIFICATION forming part of Letters Patent No. 361,601, dated April 19, 1887.

Application filed October 7, 1886. Serial No. 215,610. (No specimens.)

*To all whom it may concern:*

Be it known that I, CARL STRAUB, of Syracuse, county of Onondaga, and State of New York, have invented a new and Improved Composition of Building Material for Architectural Purposes, of which the following is a full, clear, and exact description.

This invention relates to an improved composition similar to the composition described in my application No. 192,943, filed February 21, 1886, the object of the present invention being to produce a dry material which, by the simple addition of water, may be used for covering walls and for other purposes.

In compounding the composition referred to, I mix eighty pounds of glue and eighty pounds of water under a moderate heat, so as to produce a thick fluid, after which I add a quantity of boiled linseed-oil, sixteen pounds of such oil being used. When the oil has become fully intermixed with the gluey fluid, I add twenty-two pounds of muriatic acid and five pounds of sulphuric acid, and after the addition of the acids the mixture is heated to about 450° and thoroughly mixed by stirring. The mixture is then allowed to cool and to stand about three days, during which time it is stirred three or four times a day for five or ten minutes at a time. At the end of the period named sixteen and one-half parts of water are added to one part of the mixture, the combined mixture and water being placed in a shallow pan, in order that there may be sifted into it without stirring as much of the following material as is necessary to fully absorb all of the solution.

The material referred to consists of one part of calcined sulphate of lime to about one-twentieth part of calcined carbonate of lime. The mass formed by the addition of the ingredients just named is allowed to stand until dry; or, if desired, the process of drying may be accelerated by the application of heat. If it is desired that the product shall have any particular color, the dry coloring is added to the lime and plaster before sifting into the fluid, the color and lime and plaster being thoroughly mixed. This insures an equal coloring throughout the mass.

In drying, this material will be found to be friable, and may be used for the purpose of finishing walls, and for such other purposes as may be desired, a sufficient quantity of water being added prior to the application of the material to the wall to make a thick plaster.

In certain instances it will be desired to cheapen, harden, and make other qualities of the dry material, and in order that this may be done a mixture is made as follows: To one part of the dry material already described add from two to sixteen parts of sulphate of lime and from three to twelve parts of dry washed sand, the proportions varying in accordance with the quality of the material which the operator wishes to produce, and this reproduced material may be applied in the manner heretofore described by mixing with water to the consistency of mortar, which can readily be applied to lath or bricks as a base for walls, the first-described material being laid on for a finish.

The material described has great adhesiveness, holding firmly to lath, wood, or iron without keying, and also adhering firmly to brick or stone, and becoming in a short time as hard as stone, although having a certain amount of elasticity. The material described will also resist the action of fire and water to a much greater extent than any of the so-called "fire and water proof" materials now in use.

In compounding the composition care should be taken that the proportions above given be accurately followed, as otherwise the material becomes hard, instead of drying in a friable mass.

Having thus fully described my invention, what I claim as new, and desire to secure by Letters Patent, is—

1. The herein-described composition of matter, consisting of glue, water, boiled linseed-oil, and muriatic and sulphuric acids, combined substantially in the proportions specified.

2. The herein-described composition of matter to be used with calcined sulphate of lime and calcined carbonate of lime, consisting of glue, boiled linseed-oil, and muriatic and sulphuric acids, all combined substantially in the proportions specified.

CARL STRAUB.

Witnesses:
SAMUEL S. RUSTON,
G. A. FURNESS,
T. S. TRUAIR.